United States Patent
Kim et al.

(10) Patent No.: US 11,101,075 B2
(45) Date of Patent: Aug. 24, 2021

(54) MULTILAYER CERAMIC ELECTRONIC COMPONENT

(71) Applicant: SAMSUNG ELECTRO-MECHANICS CO., LTD., Suwon-si (KR)

(72) Inventors: Tae Hyeok Kim, Suwon-si (KR); Yeon Ho Choi, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 0 days.

(21) Appl. No.: 16/934,316

(22) Filed: Jul. 21, 2020

(65) Prior Publication Data

US 2020/0350123 A1    Nov. 5, 2020

Related U.S. Application Data

(63) Continuation of application No. 16/200,475, filed on Nov. 26, 2018, now Pat. No. 10,748,712.

(30) Foreign Application Priority Data

Oct. 10, 2018    (KR) .................. 10-2018-0120590

(51) Int. Cl.
| | | |
|---|---|---|
| *H01G 4/30* | (2006.01) | |
| *H01G 4/005* | (2006.01) | |
| *H01G 4/12* | (2006.01) | |

(52) U.S. Cl.
CPC .............. *H01G 4/30* (2013.01); *H01G 4/005* (2013.01); *H01G 4/12* (2013.01)

(58) Field of Classification Search
CPC .......... H01G 4/33; H01G 4/012; H01G 4/232; H01G 4/30; H01G 4/12; H01G 4/005
See application file for complete search history.

(56) References Cited

U.S. PATENT DOCUMENTS

2013/0033154 A1*   2/2013   Sakuratani ............... H01G 4/30
                                                        310/366
2015/0014035 A1    1/2015   Park
(Continued)

FOREIGN PATENT DOCUMENTS

| KR | 10-2015-0006622 A | 1/2015 |
| KR | 10-2015-0125335 A | 11/2015 |
| KR | 10-2016-0099881 A | 8/2016 |

OTHER PUBLICATIONS

Notice of Allowance dated Apr. 10, 2020 in U.S. Appl. No. 16/200,475.

*Primary Examiner* — Michael P McFadden
(74) *Attorney, Agent, or Firm* — Morgan, Lewis & Bockius LLP

(57) ABSTRACT

A multilayer ceramic electronic component includes: a ceramic body including a dielectric layer and first and second internal electrodes stacked to be alternately exposed to first and second outer surfaces with the dielectric layer interposed therebetween; and first and second external electrodes disposed on the first and second outer surfaces of the ceramic body to be electrically connected to the first and second internal electrodes, respectively. The ceramic body further includes a protective layer disposed on at least one of upper and lower portions of the first and second internal electrodes, the protective layer includes a plurality of dummy electrode cells each having the plurality of dummy electrodes stacked thereon, and a thickness from the uppermost dummy electrode to the lowermost dummy electrode of each of the plurality of dummy electrode cells is greater than a length of each of the plurality of dummy electrode cells.

20 Claims, 4 Drawing Sheets

(56) References Cited

U.S. PATENT DOCUMENTS

2015/0096795 A1\* 4/2015 Hong ................. H01G 4/30
                                                                                                    174/260
2015/0318110 A1   11/2015 Lee
2016/0240310 A1\*  8/2016 Kim ................... H05K 1/111

\* cited by examiner

MULTILAYER CERAMIC ELECTRONIC COMPONENT

CROSS-REFERENCE TO RELATED APPLICATION(S)

This application is a continuation of U.S. patent application Ser. No. 16/200,475 filed on Nov. 26, 2018 which claims the benefit of priority to Korean Patent Application No. 10-2018-0120590 filed on Oct. 10, 2018 in the Korean Intellectual Property Office, the disclosures of each are incorporated herein by reference in their entirety.

TECHNICAL FIELD

The present disclosure relates to a multilayer ceramic electronic component.

BACKGROUND

A multilayer ceramic electronic component has been widely used as a component of an information technology (IT) device such as a computer, a personal digital assistant (PDA), a cellular phone, or the like, since it has a small size, implements high capacitance, and may be easily mounted, and has also been widely used as an electrical component since it has high reliability and high strength characteristics.

Recently, a thickness of the multilayer ceramic electronic component has been reduced due to thinning of IT products. As a result, the strength of the multilayer ceramic electronic component becomes increasingly important, and the problem of delamination that may occur in the multilayer ceramic electronic component is also increasingly occurring.

SUMMARY

An aspect of the present disclosure may provide a multilayer ceramic electronic component having improved strength.

According to an aspect of the present disclosure, a multilayer ceramic electronic component includes: a multilayer ceramic electronic component, including: a ceramic body including a dielectric layer and first and second internal electrodes stacked to be alternately exposed to first and second outer surfaces with the dielectric layer interposed therebetween; and first and second external electrodes disposed on the first and second outer surfaces of the ceramic body to be electrically connected to the first and second internal electrodes, respectively. The ceramic body further includes a protective layer disposed on at least one of upper and lower portions of the first and second internal electrodes, the protective layer includes a plurality of dummy electrode cells each having the plurality of dummy electrodes stacked thereon, and a thickness from the uppermost dummy electrode to the lowermost dummy electrode of each of the plurality of dummy electrode cells is greater than a length of each of the plurality of dummy electrode cells.

According to another aspect of the present disclosure, a multilayer ceramic electronic component includes: a ceramic body including a dielectric layer and first and second internal electrodes stacked to be alternately exposed to first and second outer surfaces with the dielectric layer interposed therebetween; and first and second external electrodes disposed on the first and second outer surfaces of the ceramic body to be electrically connected to the first and second internal electrodes, respectively. The ceramic body further includes a protective layer disposed on at least one of upper and lower portions of the first and second internal electrodes, the protective layer includes a dummy electrode cell having a plurality of dummy electrodes stacked thereon and first and second outer dummy electrode cells in electrical contact with the first and second external electrodes, respectively, a thickness from an uppermost dummy electrode to a lowermost dummy electrode of the dummy electrode cell is greater than a length of the dummy electrode cell, and the first and second outer dummy electrode cells each have a longer length than the dummy electrode cell.

BRIEF DESCRIPTION OF DRAWINGS

The above and other aspects, features, and advantages of the present disclosure will be more clearly understood from the following detailed description taken in conjunction with the accompanying drawings, in which.

DETAILED DESCRIPTION

Hereinafter, exemplary embodiments of the present disclosure will now be described in detail with reference to the accompanying drawings.

A multilayer ceramic electronic component according to an exemplary embodiment in the present disclosure, particularly, a multilayer ceramic capacitor will hereinafter be described. However, the multilayer ceramic electronic component according to the present disclosure is not limited thereto.

Figure 1:
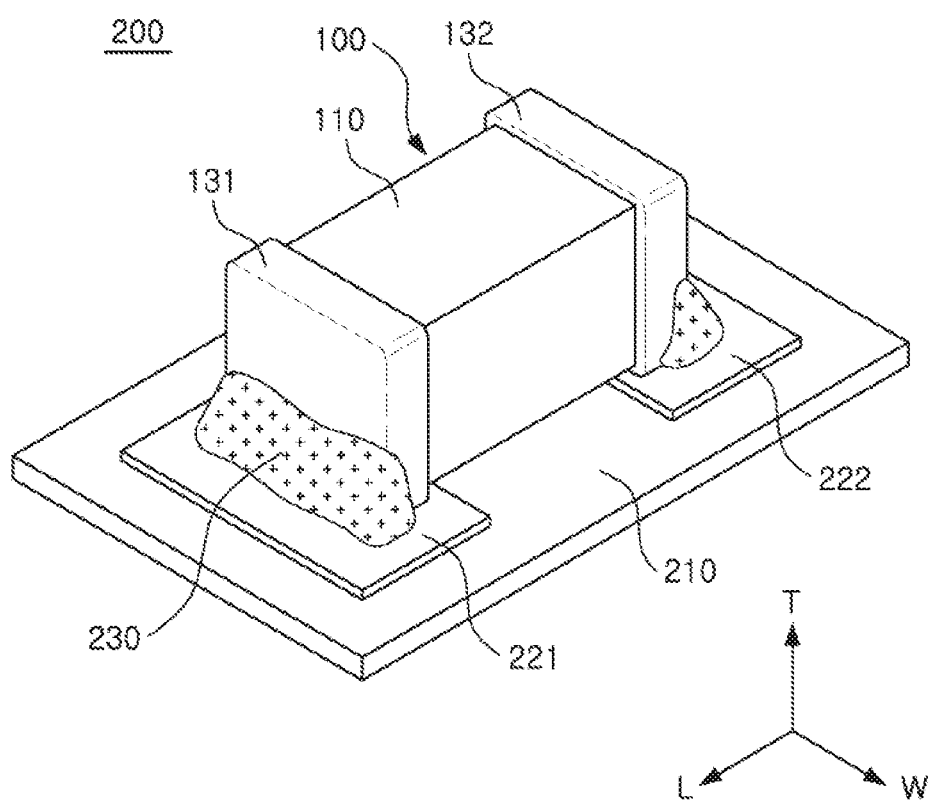
FIG. 1 is a perspective view showing a multilayer ceramic electronic component according to an exemplary embodiment of the present disclosure and a mounting thereof.

FIG. 1 is a perspective view showing a multilayer ceramic electronic component according to an exemplary embodiment of the present disclosure and a mounting thereof.

Referring to FIG. 1, a multilayer ceramic electronic component 100 according to an exemplary embodiment of the present disclosure may include a ceramic body 110 and first and second external electrodes 131 and 132, in which the multilayer ceramic electronic component 100 may be mounted (200) on first and second electrode pads 221 and 222 on a board 210.

The ceramic body 110 may be formed of a hexahedron having opposite end surfaces in a length direction L, opposite side surfaces in a width direction W, and opposite side surfaces in a thickness direction T. The ceramic body 110 may be formed by stacking a plurality of dielectric layers 111 in the thickness direction T and then sintering the plurality of dielectric layers 111. A shape and a dimension of the ceramic body 110 and the number (one or more) of stacked dielectric layers 111 are not limited to those illustrated in the present exemplary embodiment.

The plurality of dielectric layers disposed in the ceramic body 110 may be in a sintered state, and adjacent dielectric layers may be integrated with each other so that boundaries therebetween are not readily apparent without using a scanning electron microscope (SEM).

For example, the ceramic body 110 may have a form in which eight corners of the hexahedron are round. Therefore, durability and reliability of the ceramic body 110 may be improved, and structural reliability of the first and second external electrodes 131 and 132 at the corners may be improved.

The dielectric layer may have a thickness arbitrarily changed in accordance with a capacitance design of the multilayer ceramic electronic component 100, and may include ceramic powders having a high dielectric constant, such as barium titanate ($BaTiO_3$) based powders or strontium titanate ($SrTiO_3$) based powders. However, a material of the dielectric layer according to the present disclosure is not limited thereto. In addition, various ceramic additives, organic solvents, plasticizers, binders, dispersants, and the like, may be added to the ceramic powders according to an object of the present disclosure.

An average particle size of the ceramic powders used to form the dielectric layer is not particularly limited, and may be controlled in order to accomplish an object of the present disclosure. For example, the average particle size of the ceramic powders used to form the dielectric layer may be controlled to be 400 nm or less. Therefore, the multilayer ceramic electronic component 100 according to an exemplary embodiment in the present disclosure may be used as a component that needs to be miniaturized and have a high capacitance, such as an information technology (IT) component.

For example, the dielectric layers may be formed by applying and then drying slurry including powders such as barium titanate ($BaTiO_3$) powders, or the like, to carrier films to prepare a plurality of ceramic sheets. The ceramic sheets may be formed by mixing ceramic powders, a binder, and a solvent with one another to prepare slurry and manufacturing the slurry in a sheet shape having a thickness of several micrometers by a doctor blade method, but are not limited thereto.

The first and second external electrodes 131 and 132 may be disposed on outer surfaces (for example, one surface and the other surface in the length direction) of the ceramic body 110 to be connected to the first and second internal electrodes, respectively, and may be configured to electrically connect the first and second internal electrodes 121 and 122 and a board to each other.

For example, the first and second external electrodes 131 and 132 may be formed of copper (Cu), palladium (Pd), platinum (Pt), gold (Au), silver (Ag), lead (Pb) or the like, or alloys thereof.

For example, the first and second external electrodes 131 and 132 may include first and second electrode layers including Cu or Ni and first and second plating layers disposed on the first and second electrode layers and including Ni or Sn.

The first and second electrode layers may be formed by a method of dipping the ceramic body 110 in a paste including a metal component or a method of printing a conductive paste including a conductive metal on at least one surface of the ceramic body 110 in the thickness direction T, and may also be formed by a sheet transfer method or a pad transfer method.

The first and second plating layers may be formed by sputtering or an electric deposition, but the first and second plating layers are not limited by the above methods.

The first and second external electrodes 131 and 132 may be electrically connected to the first and second electrode pads 221 and 222 by first and second solders 230. For example, the first and second solders 230 may be more closely coupled to the first and second external electrodes 131 and 132 according to a reflow process.

Figure 2:
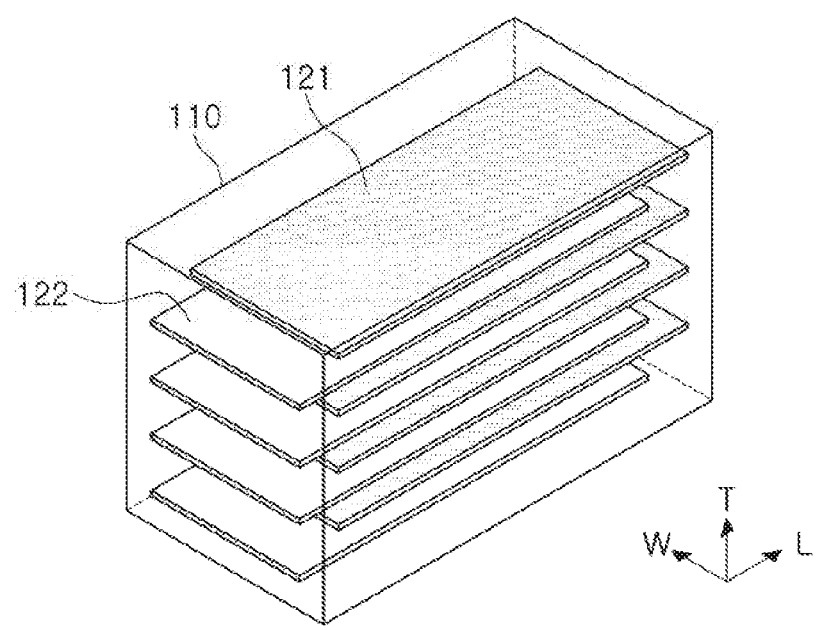
FIG. 2 is a perspective view showing a form of an internal electrode of the multilayer ceramic electronic component according to an exemplary embodiment of the present disclosure.

FIG. 2 is a perspective view showing a form of an internal electrode of the multilayer ceramic electronic component according to the exemplary embodiment of the present disclosure.

Referring to FIG. 2, the ceramic body 110 may include the first and second internal electrodes 121 and 122, and the dielectric layer disposed between the first and second internal electrodes 121 and 122.

The first and second internal electrodes 121 and 122 are stacked so as to be alternately exposed to the first and second outer surfaces (for example, one end surface and the other end surface in the length direction) with the dielectric layer interposed therebetween so as to have different polarities.

The first internal electrodes 121 and the second internal electrodes 122 may be formed to be alternately exposed to one end surface and the other end surface of the ceramic body 110 in the length direction L of the ceramic body 110 in the stack direction of the dielectric layers by printing a conductive paste including a conductive metal, and may be electrically insulated from each other by each of the dielectric layers disposed therebetween.

That is, the first and second internal electrodes 121 and 122 may be electrically connected to the first and second external electrodes 131 and 132 formed on opposite end surfaces of the ceramic body 110 in the length direction L of the ceramic body 110 through portions alternately exposed to the opposite end surfaces of the ceramic body 110 in the length direction of the ceramic body 110, respectively.

For example, the first and second internal electrodes 121 and 122 may have an average particle size of 0.1 to 0.2 μm, and may be formed of a conductive paste for an internal electrode including 40 to 50 wt % of conductive metal powders, but are not limited thereto.

The conductive paste for an internal electrode may be applied to the ceramic sheets by a printing method, or the like, to form internal electrode patterns. A method of printing the conductive paste may be a screen printing method, a gravure printing method, or the like, but is not limited thereto. Two hundred or three hundred ceramic sheets on which the internal electrode patterns are printed may be stacked, pressed, and sintered to manufacture the ceramic body 110.

Therefore, when voltages are applied to the first and second external electrodes, electric charges may be accumulated between the first and second internal electrodes 121 and 122 facing each other. In this case, a capacitance of the multilayer ceramic electronic component 100 may be in proportion to an area of a region in which the first and second internal electrodes 121 and 122 overlap each other.

That is, when the area of the region in which the first and second internal electrodes 121 and 122 overlap each other is significantly increased, a capacitance may be significantly increased even in a capacitor having the same size.

Thicknesses of the first and second internal electrodes 121 and 122 may be determined depending on the purpose, and may be, for example, 0.4 μm or less. In addition, the number of layers of the first and second internal electrodes 121 and 122 may be 400 or more. Therefore, the multilayer ceramic electronic component 100 may be used as a component that needs to be miniaturized and have a high capacitance, such as an information technology (IT) component.

Since the thickness of the dielectric layer corresponds to an interval between the first and second internal electrodes 121 and 122, the smaller the thickness of the dielectric layer, the greater the capacitance of the multilayer ceramic electronic component 100.

The conductive metal included in the conductive paste forming the first and second internal electrodes 121 and 122 may be nickel (Ni), copper (Cu), palladium (Pd), silver (Ag), lead (Pb), or platinum (Pt), or alloys thereof. However, the conductive metal according to the present disclosure is not limited thereto.

The larger the interval between the first and second internal electrodes 121 and 122, the more the withstand voltage characteristics of the ceramic body 110 may be improved.

When the multilayer ceramic electronic component 100 requires high withstand voltage characteristics such as electrical components, the multilayer ceramic electronic component 100 may be designed so that an average thickness of the dielectric layers 111 is twice as large as that of the first and second internal electrodes 121 and 122. Accordingly, the multilayer ceramic electronic device 100 may have the high withstand voltage characteristics so as to be used as electrical components.

In addition, the durability (for example, warpage endurance) of the ceramic body 110 may have high reliability when the width of the ceramic body 110 exceeds 0.5 times the thickness thereof.

Figure 3:
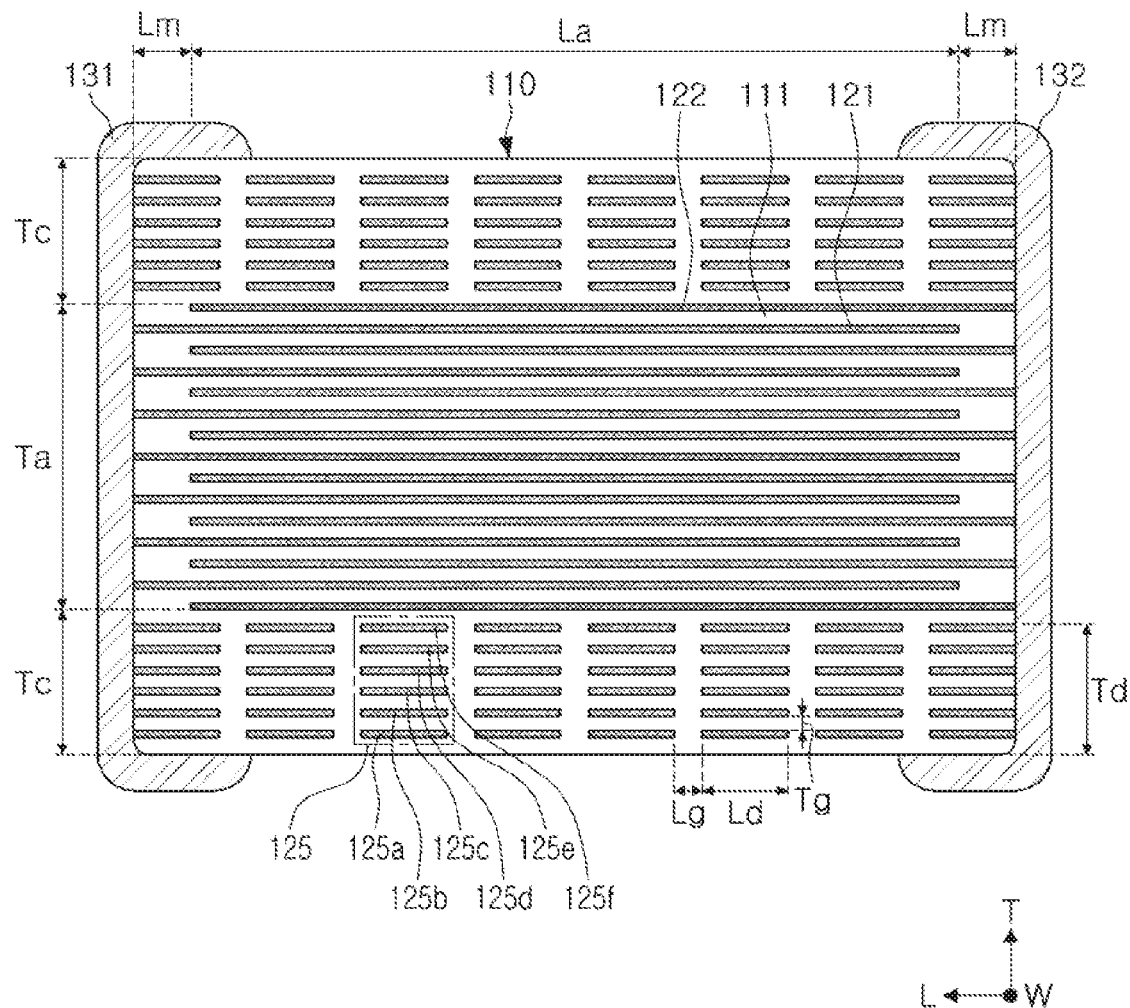
FIG. 3 is a side view showing a dummy electrode cell of the multilayer ceramic electronic component according to the exemplary embodiment of the present disclosure.

FIG. 3 is a side view showing a dummy electrode cell of the multilayer ceramic electronic component according to the exemplary embodiment of the present disclosure.

Referring to FIG. 3, a length of the region in which the first and second internal electrodes 121 and 122 overlap each other may be La and a spacing distance between the first and second internal electrodes 121 and 122 and the second and first external electrodes 132 and 131 in a length direction may be Lm, and a length of the ceramic body 110 may be (2*Lm+La).

The ceramic body 110 may further include a protective layer disposed on at least one of upper and lower portions of the first and second internal electrodes 121 and 122. Accordingly, the ceramic body 110 may improve durability against external impact (warpage, tensile, or the like).

The protective layer has a thickness of Tc when disposed only on one of the upper and lower portions, a thickness of (2*Tc) when disposed on both the upper and lower portions, and the thickness of the ceramic body 110 is (Ta+2*Tc).

As the thickness Tc of the protective layer is increased, the durability of the ceramic body 110 may be improved. In addition, as the thickness (for example, 1 mm or less) of the ceramic body 110 is reduced, the durability of the ceramic body 110 may be reduced. Therefore, as the thickness (Ta+2*Tc) of the ceramic body 110 is reduced, the ratio of the protective layer Tc to the thickness (Ta+2*Tc) of the ceramic body 110 may be increased.

The protective layer may include a plurality of dummy electrodes 125a, 125b, 125c, 125d, 125e, and 125f. The plurality of dummy electrodes 125a, 125b, 125c, 125d, 125e, and 125f may include the same material as the first and second internal electrodes 121 and 122 and may be stacked by the same process, but are not limited thereto.

Generally, a ceramic may be a brittle material, and therefore may be cracked or broken when subjected to a strong force.

Since the conductive material included in the plurality of dummy electrodes 125a, 125b, 125c, 125d, 125e, and 125f has a higher strength than a general ceramic, the protective layer including the plurality of dummy electrodes 125a, 125b, 125c, 125d, 125e, and 125f may further improve durability against the external impact (warpage, tensile, or the like).

As the number of (for example, six in FIG. 3) the stacked plurality of dummy electrodes 125a, 125b, 125c, 125d, 125e, and 125f is increased, the protective layer may have stronger durability according to the increase in the proportion of the conductive material.

In addition, the plurality of dummy electrodes 125a, 125b, 125c, 125d, 125e, and 125f may have stronger strength as the thickness to each length is increased.

In addition, the protective layer may have the improved durability by more efficiently using the stronger strength of the plurality of dummy electrodes 125a, 125b, 125c, 125d, 125e, and 125f as a distribution ratio of each layer of the plurality of dummy electrodes 125a, 125b, 125c, 125d, 125e, and 125f is increased.

That is, the plurality of dummy electrodes 125a, 125b, 125c, 125d, 125e, and 125f may have the strong strength when having a large thickness to a length while having a large distribution ratio in a length direction with a large number of stacked layers, thereby greatly improving the durability of the protective layer.

Accordingly, the multilayer ceramic electronic component according to the embodiment of the present disclosure may include a plurality of dummy electrode cells 125 each having the a plurality of dummy electrodes 125a, 125b, 125c, 125d, 125e, and 125f stacked thereon. Here, the thickness Tc from the uppermost dummy electrode 125f to the lowermost dummy electrode 125a of each of the plurality of dummy electrode cells 125 may be greater than a length Ld of the plurality of dummy electrode cells 125.

As the plurality of dummy electrode cells 125 are disposed on the protective layer, the protective layer may have the high durability against the external impact (e.g., warpage, tensile, or the like).

A spacing distance Lg between the plurality of dummy electrode cells 125 may be shorter than a length Ld of the plurality of dummy electrode cells 125, respectively, in order to distribute a large number of dummy electrodes 125a, 125b, 125c, 125d, 125e, and 125f in the length direction. Therefore, the protective layer may have the stronger durability against the external impact (for example, warpage, tensile, or the like).

For example, the total length (for example, (8*Ld) in FIG. 3) of the plurality of dummy electrode cells 125 may be 0.8 times or more the length La+Lm of each of the first and second internal electrodes 121 and 122. Accordingly, the protective layer may have the stronger durability as the conductive material distribution ratio increases.

For example, the total length (for example, (8*Ld) in FIG. 3) of the plurality of dummy electrode cells 125 may be within a range from 0.6 times or more to 1 times or less the length (La+2*Lm) of the ceramic body 110. Accordingly, the protective layer may have the stronger durability as the conductive material distribution ratio increases.

For example, the plurality of dummy electrodes 125a, 125b, 125c, 125d, 125e, and 125f may be designed to have the same thickness as the thickness of the first and second internal electrodes 121 and 122. Accordingly, the ceramic body 110 may suppress the occurrence of delamination due to a step difference between the internal electrode and the dummy electrode.

For example, an interval Tg between the plurality of dummy electrodes 125a, 125b, 125c, 125d, 125e, and 125f in the thickness direction may be designed to be the same as the interval between the first and second internal electrodes 121 and 122 in the thickness direction. Accordingly, the ceramic body 110 may suppress the occurrence of delamination due to the step difference of the dielectric layer.

Figure 4:
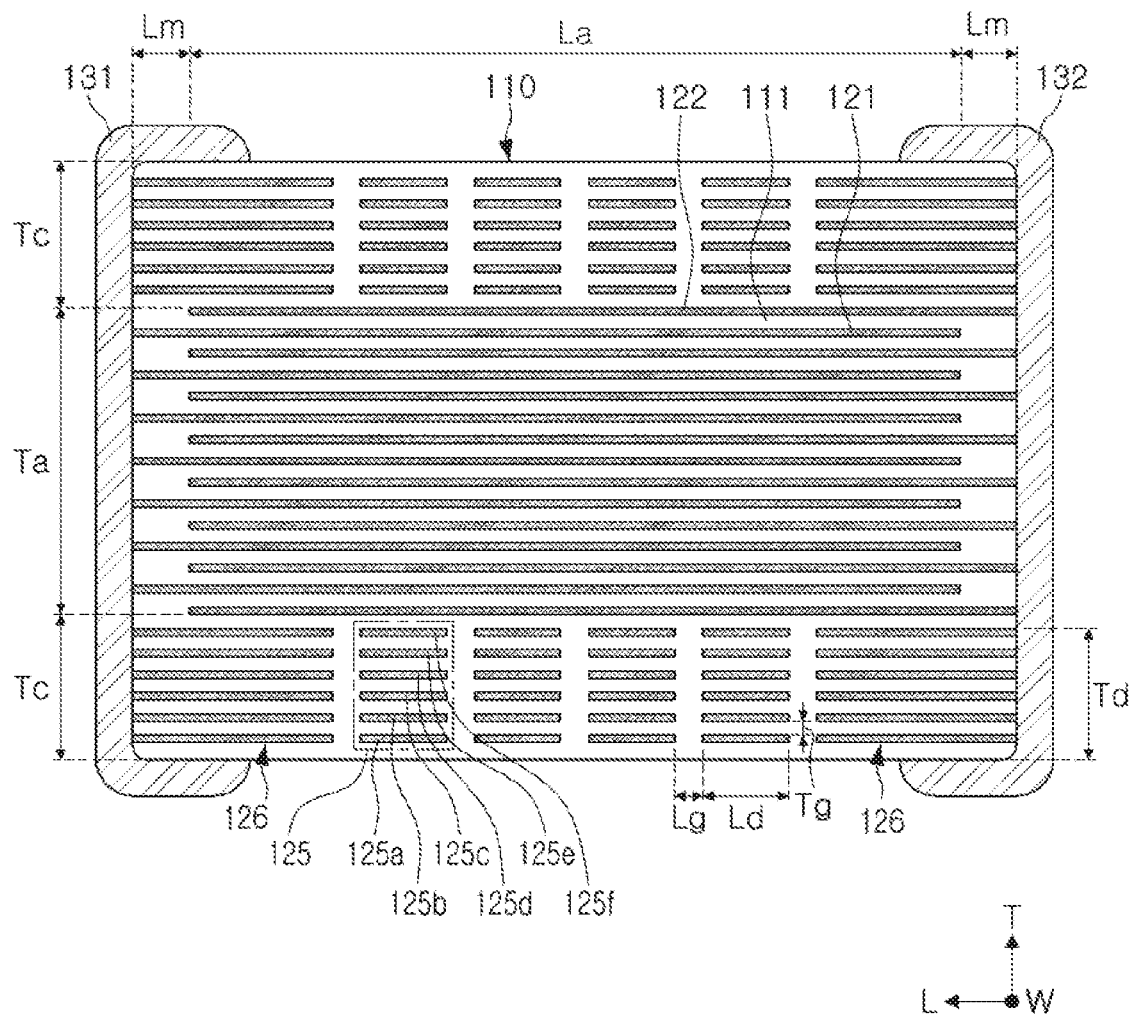
FIG. 4 is a side view showing a dummy electrode cell at an edge of the multilayer ceramic electronic component in a length direction according to another exemplary embodiment of the present disclosure.

FIG. 4 is a side view showing a dummy electrode cell at an edge of the multilayer ceramic electronic component in a length direction according to another exemplary embodiment of the present disclosure.

Referring to FIG. 4, the protective layer may further comprise two outer dummy electrode cells 126 closest to the first or second external electrode that may be connected to the first or second external electrode 131 or 132, and may have a length longer than the length Ld of each of the dummy electrode cells 125.

Accordingly, the distribution of the conductive material in the ceramic body 110 can be more balanced, so that the durability against the external impact of the ceramic body 110 may be improved.

In addition, the length of the outer dummy electrode cells 126 closest to the first or second external electrode may be longer than the spaced length Lm from the first or second internal electrode 121 or 122 to the second or first external electrode 132 or 131.

Therefore, the outer dummy electrode cells 126 closest to the first or second external electrode may suppress the delamination due to a margin between the first and second internal electrode 121 and 122 and the second and first external electrodes 132 and 131.

As set forth above, according to an embodiment in the present disclosure, the multilayer ceramic electronic component may have the improved strength and may suppress the delamination according to the design.

While exemplary embodiments have been shown and described above, it will be apparent to those skilled in the art that modifications and variations could be made without departing from the scope of the present disclosure as defined by the appended claims.

What is claimed is:

1. A multilayer ceramic electronic component comprising:
a ceramic body including a dielectric layer and first and second internal electrodes stacked to be alternately exposed to first and second outer surfaces with the dielectric layer interposed therebetween; and
first and second external electrodes disposed on the first and second outer surfaces of the ceramic body to be connected to the first and second internal electrodes, respectively,
wherein the ceramic body further includes a protective layer disposed on at least one of upper and lower portions of the first and second internal electrodes,
the protective layer includes a plurality of dummy electrode cells each having a plurality of dummy electrodes stacked therein,
a thickness from an uppermost dummy electrode to a lowermost dummy electrode of at least one of the plurality of dummy electrode cells is greater than a length thereof,
the at least one of the plurality of dummy electrode cells is spaced apart from the first and second external electrodes, and
a spacing distance between the plurality of dummy electrode cells in a length direction is shorter than a length of each of the plurality of dummy electrode cells in the length direction.

2. The multilayer ceramic electronic component of claim 1, wherein a total length of the plurality of dummy electrode cells is 0.8 times or more a length of the first and second internal electrodes, respectively.

3. The multilayer ceramic electronic component of claim 2, wherein a thickness of the ceramic body is 1 mm or less.

4. The multilayer ceramic electronic component of claim 3, wherein one of the plurality of dummy electrodes has a thickness substantially equal to that of one of the first and second internal electrodes.

5. The multilayer ceramic electronic component of claim 1, wherein a total length of the plurality of dummy electrode cells is within a range from 0.6 times or more to less than 1 times a length of the ceramic body.

6. The multilayer ceramic electronic component of claim 5, wherein a thickness of the ceramic body is 1 mm or less.

7. The multilayer ceramic electronic component of claim 6, wherein an interval between the plurality of dummy electrodes in a thickness direction is substantially the same as an interval between the first and second internal electrodes in the thickness direction.

8. The multilayer ceramic electronic component of claim 1, wherein a thickness of the ceramic body is 1 mm or less.

9. The multilayer ceramic electronic component of claim 1, wherein one of the plurality of dummy electrodes has a thickness substantially equal to that of one of the first and second internal electrodes.

10. The multilayer ceramic electronic component of claim 1, wherein an interval between the plurality of dummy electrodes in a thickness direction is substantially the same as an interval between the first and second internal electrodes in the thickness direction.

11. A multilayer ceramic electronic component comprising:
a ceramic body including a dielectric layer and first and second internal electrodes stacked to be alternately exposed to first and second outer surfaces with the dielectric layer interposed therebetween; and
first and second external electrodes disposed on the first and second outer surfaces of the ceramic body to be connected to the first and second internal electrodes, respectively,
wherein the ceramic body further includes a protective layer disposed on at least one of upper and lower portions of the first and second internal electrodes,
the protective layer includes a plurality of dummy electrode cells each having a plurality of dummy electrodes stacked therein,
a thickness from an uppermost dummy electrode to a lowermost dummy electrode of at least one of the plurality of dummy electrode cells is greater than a length thereof,
the at least one of the plurality of dummy electrode cells is spaced apart from the first and second external electrodes, and
a length of the dummy electrode cell connected to the external electrodes is greater than those of the dummy electrode cells not connected to the external electrodes.

12. The multilayer ceramic electronic component of claim 11, wherein a total length of the plurality of dummy electrode cells is 0.8 times or more a length of the first and second internal electrodes, respectively.

13. The multilayer ceramic electronic component of claim 12,
   wherein a thickness of the ceramic body is 1 mm or less.

14. The multilayer ceramic electronic component of claim 11,
   wherein a total length of the plurality of dummy electrode cells is within a range from 0.6 times or more to less than 1 times a length of the ceramic body.

15. The multilayer ceramic electronic component of claim 14,
   wherein a thickness of the ceramic body is 1 mm or less.

16. The multilayer ceramic electronic component of claim 11,
   wherein one of the plurality of dummy electrodes has a thickness substantially equal to that of one of the first and second internal electrodes.

17. The multilayer ceramic electronic component of claim 16,
   wherein an interval between the plurality of dummy electrodes in a thickness direction is substantially the same as an interval between the first and second internal electrodes in the thickness direction.

18. The multilayer ceramic electronic component of claim 11,
   wherein a thickness of the ceramic body is 1 mm or less.

19. The multilayer ceramic electronic component of claim 11,
   wherein one of the plurality of dummy electrodes has a thickness substantially equal to that of one of the first and second internal electrodes.

20. The multilayer ceramic electronic component of claim 11,
   wherein an interval between the plurality of dummy electrodes in a thickness direction is substantially the same as an interval between the first and second internal electrodes in the thickness direction.

* * * * *